(12) United States Patent
MacFarlane et al.

(10) Patent No.: US 8,005,704 B2
(45) Date of Patent: Aug. 23, 2011

(54) METHOD AND SYSTEM FOR TRACKING OF WORK-ITEM REVISIONS

(76) Inventors: Bryan MacFarlane, Duvall, WA (US); Ling Bao, Redmond, WA (US); Tomas Talius, Sammamish, WA (US); Valeri N. Tolkov, Kirkland, WA (US)

( * ) Notice: Subject to any disclaimer, the term of this patent is extended or adjusted under 35 U.S.C. 154(b) by 1272 days.

(21) Appl. No.: 11/039,185

(22) Filed: Jan. 19, 2005

(65) Prior Publication Data

US 2006/0173879 A1    Aug. 3, 2006

(51) Int. Cl.
G06F 9/44    (2006.01)
(52) U.S. Cl. .................................................. 705/7.21
(58) Field of Classification Search ...................... 705/8
See application file for complete search history.

(56) References Cited

U.S. PATENT DOCUMENTS

| | | | |
|---|---|---|---|
| 5,806,078 A * | 9/1998 | Hug et al. | 715/205 |
| 6,078,934 A * | 6/2000 | Lahey et al. | 715/205 |
| 6,182,245 B1 * | 1/2001 | Akin et al. | 714/38 |
| 7,155,400 B1 * | 12/2006 | Jilk et al. | 705/7.14 |
| 7,293,029 B2 * | 11/2007 | Cope | 707/100 |
| 7,849,257 B1 * | 12/2010 | Kim | 711/112 |
| 2002/0120480 A1 * | 8/2002 | Kroeger | 705/7 |
| 2006/0218028 A1 * | 9/2006 | Kelly et al. | 705/8 |

* cited by examiner

*Primary Examiner* — Romain Jeanty
(74) *Attorney, Agent, or Firm* — Wolf, Greenfield & Sacks, P.C.

(57) ABSTRACT

A method for work-item tracking, in a computer system that includes client computers and at least one server maintaining a database, includes defining at least one work item, associating version identifiers with corresponding versions of at least one work item, and storing, in the database, work-item data. The work-item data can include the current version of the work item, one or more prior versions of the work item, and the version identifiers. A computer readable medium is encoded with a program that, when executed, can perform the method for work-item tracking.

19 Claims, 4 Drawing Sheets

200

210 defining at least one work item

220 associating version identifiers with a current version and one or more prior versions of the at least one work item

230 storing the versions and the version identifiers in a database

240 receiving a database query

250 displaying information associated with at least one of the prior versions

| FIELD | OLD VALUE | NEW VALUE |
|---|---|---|
| Person ID | 1026 | 1029 |
| Assignee | lingbao | lukeab |
| Revision | 10 | 11 |
| Triage | submit | investigate |
| Author | smitha | lingbao |
| Created | 12.2.04 | 12.09.04 |

510

520

METHOD AND SYSTEM FOR TRACKING OF WORK-ITEM REVISIONS

BACKGROUND OF INVENTION

1. Field of Invention

This invention relates to methods and systems for tracking of work-related items, and, in particular, to computer-based methods and systems for tracking of tasks and other work-related items.

2. Discussion of Related Art

In collaborative work environments, tasks are often created, and progress on the tasks must be tracked. To facilitate tracking of a task, a computer system can be used to store work items that identify tasks, and to update the work items when an action is taken by, for example, an individual assigned to the task.

A work item can be, for example, an actionable item, such as a task, which can be assigned to a specific person and can have associated data related to an associated action. A work item can also be, for example, work-related data, such a work scenario or work requirement, that should be tracked. A work item can be associated with a variety of projects. In the case of a software project, a work item can contain information about a specific issue such as, for example, a software bug or a change request.

The information contained in a work item can include values such as dates, integers, worker identifiers, or action identifiers. A work item can be stored as, for example, a row of values in a database, where the values are associated with corresponding field types. The work items can be updated to track progress on activity associated with the work item.

SUMMARY OF INVENTION

Some embodiments of the invention arise from the realization that prior tracking systems can be improved by storing prior versions of updated work items. For example, full copies of all prior versions of a work item can be retained each time a work item is changed. The versions can be stored in a database accessible to individuals affected by the work item. Query and display features can also be provided to permit extraction of historical data from a work-item database. In this manner, a historical record of the evolution of a work item is available.

The database can be supported by, for example, a networked server. Individuals requiring access to the database can manage and/or search the database via networked clients. Each version of a work item can be tagged with a version author and a date/time of creation of the version.

Thus, some embodiments of the invention protect work-item data against the risk of accidental or malicious damage to stored work items. Moreover, a fully auditable database of work-item history can be made available. For example, work item values that have changed during the course of a project can be retrieved, as needed.

Accordingly, one embodiment of the invention features a method for work-item tracking in a computer system that includes a database. The method includes defining at least one work item, associating version identifiers with corresponding versions of the work items, and storing work-item data in the database. The work-item data includes the current version of the work item, one or more prior versions of the work item, and corresponding version identifiers.

Another embodiment of the invention features a computer readable medium encoded with a program that, when executed, performs the above-described method for work-item tracking.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
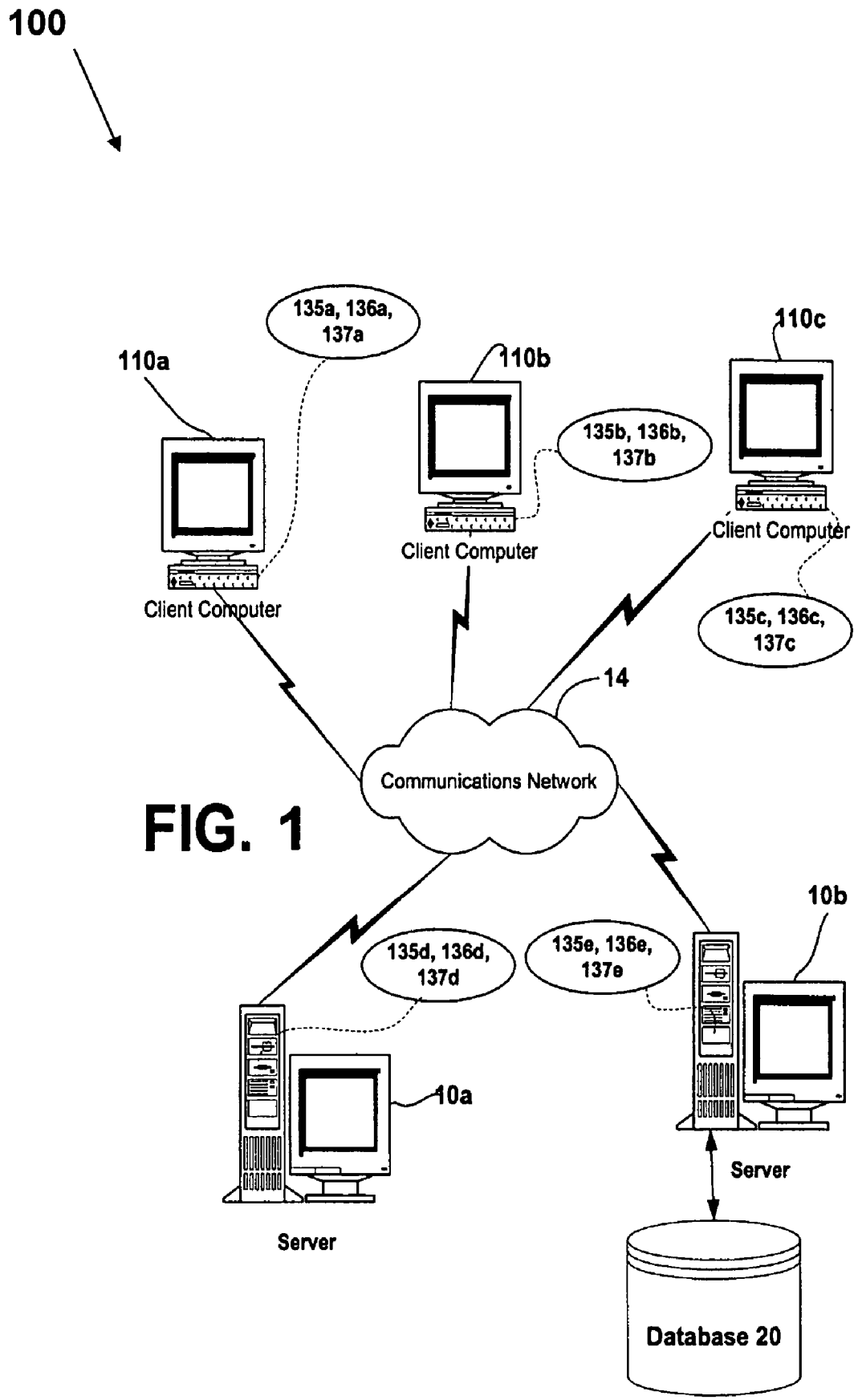
FIG. 1 is a block diagram representing an exemplary network environment in which the present invention may be implemented.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In some embodiments of the invention, work items are units of work assigned to members of a product development team. More generally, a work item can embody information of relevance to a project, such as a project scenario or a project requirement that should be tracked and audited during the course of the project.

The work items can be modified—for example, having associated tasks redefined and/or reassigned—by individuals having access to the work items. Work times can be reviewed via, for example, tracking reports and scheduled via, for example, associated software tools. Similarly, for example, lists of work items can be exported to spreadsheet-based software tools for further analysis.

In some embodiments, teams define their own work-item types having customized field types, state-transitions, and/or rules. In some embodiments that entail software development, developers use work items to prioritize their work, make notes about dependencies, and to notify testers and other teammates when a repair is completed or requires additional action. Architects, designers, testers, technical writers, localizers, and usability engineers can create and assign work items to record issues related to a project-configuration item and track progress toward the completion of their goals.

Reference is first made to FIG. 1 for a brief general description of a suitable computing environment in which one embodiment of the invention may be implemented. It should be understood, however, that handheld, portable and other computing devices of all kinds are contemplated for use in connection with the present invention. Additionally, the present invention may be implemented in an environment of networked hosted services in which very little or minimal client resources are implicated, e.g., a networked environment in which the client device serves merely as a browser or interface to the World Wide Web.

Although not required, the invention will be described in the general context of computer-executable instructions, such as program modules, being executed by one or more computers, such as client workstations, servers, and/or other devices. Generally, program modules include routines, programs, objects, components, data structures and the like that perform particular tasks or implement particular abstract data types. Typically, the functionality of the program modules may be combined or distributed as desired in various embodiments.

FIG. 1 is a block diagram representing a computer system 100 based on a network environment in which one embodiment of the present invention may be implemented. The computer system includes one or more servers 10a, 10b that are interconnected via a communications network 14—for example, a local area network (LAN) or a wide area network (WAN), intranet or the Internet—with a number of client computers 110a, 110b, 110c or other client devices 111, such as a portable computer, handheld computer, thin client, network appliance, etc.

In a network environment in which the communications network 14 is the Internet, for example, the servers 10 can be Web servers with which the clients 110a, 110b, 111 communicate via any of a number of known protocols such as hypertext transfer protocol (HTTP) or any other suitable protocol. Communications may be wireless, where appropriate.

The client computers 110a, 110b, 110c and the server computer(s) 10a, 10b may be equipped with various application program modules 135, other program modules 136 and program data 137, and with connections or access to various types of storage elements or objects, across which files may be stored or to which portion(s) of files may be downloaded or migrated.

Any server 10a, 10b, etc. may be responsible for the maintenance and updating of a database 20, in accordance with the present invention. Thus, the present invention can be utilized in a computer network environment having client computers 110a, 110b for accessing and interacting with a computer network and server computers 110a, 110b for interacting with client computers 110a, 110b and one or more databases 20.

Embodiments of the invention that include computer-readable media for carrying or having computer-executable instructions or data structures stored thereon can be any available media which can be accessed by a general purpose or special purpose computer. By way of example, and not limitation, such computer-readable media can include physical computer-readable media such as RAM, ROM, EEPROM, CD-ROM, DVD, and/or other optical disk storage, magnetic disk storage and/or other magnetic storage devices, and/or any other physical medium that can be used to carry or store desired program code in the form of computer-executable instructions or data structures and that can be accessed by a general purpose or special purpose computer, which, as is known in the art, may be referred to generally as computer storage media.

When information is transferred or provided over a network or another communications connection (either hardwired, wireless, or a combination of hardwired or wireless) to a computer, a computer can view the connection as a computer-readable medium. Thus, any such connection can be termed a computer-readable medium. Combinations of the above should also be included within the scope of computer-readable media. Computer-executable instructions include, for example, any instructions and data which cause a general purpose computer, special purpose computer, or special purpose processing device to perform a certain function or group of functions. The computer-executable instruction may be, for example, binaries, intermediate format instructions such as assembly language, or even source code.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Embodiments of the invention may be practiced in distributed computing environments where tasks are performed by remote processing devices that are linked through a communications network or other data transmission medium. In a distributed computing environment, program modules may be located in both local and remote computer storage media including memory storage devices.

Figure 2:
FIG. 2 is a flow diagram of a method for tracking of work items, in accordance with one embodiment of the present invention.

Referring next to FIG. 2, some embodiments of the invention support tracking of work items stored in a shared database, such as the database 20 described above. In these embodiments, a team of workers can, for example, view, edit, and/or query work items stored in a repository supported by the database.

Prior versions of work items are retained in the database to preserve an historical record of changes to a work item. A query capability can be provided to permit searches of work-item data stored in the database, and display capabilities can be provided to present query results in a convenient manner. These embodiments permit, for example, audits of work item changes, which provide, for example, protection against inadvertent or malicious changes of items stored in the database.

FIG. 2a is a flow diagram of a method 200 for work-item tracking in a computer system, such as the computer system 100 illustrated in FIG. 1, in accordance with one embodiment of the invention. The computer system includes client computers and at least one server maintaining a database of work item-related data. The method 200 includes defining 210 at least one work item, associating 220 version identifiers with a corresponding current version and one or more one prior versions of the at least one work item, and storing 230, in the database, work item-related data associated with the current and prior versions of the at least one work item. The data can be stored, for example, in the database 20 managed by the server 10b.

The work items include one or more fields that are associated with corresponding field values. The stored work-item data includes current versions of work items and one or more prior versions of the work items, as well as the version identifiers associated with the stored work items. Thus, in contrast with some conventional methods, the method 200 supports preservation of, and searches of, a historical repository of work item changes.

Version identifiers can be associated with their corresponding versions at the time the version is created. A current version can become a prior version at the time a change is made in the current work item. At that time, the new, changed, version becomes the current version and can have an associated new version identifier. In some embodiments, the version identifier of a particular version need does not change as newer version are created.

The stored data can include a full copy of each version of the work item. To conserve storage space, some embodiments of the invention only store changed values rather than creating duplicates of all values of a previous version.

Work items, as described above, can be a task or other work-related data that can be assigned to one or more specific persons or other work entities. The data associated with a work item can be stored, for example, as a row of entries, which can be field values associated with corresponding field types.

Broadly, a task tracked by a work item can correspond to any of a wide range of activities. For convenience, however, the following illustrative description will refer to software development projects and software bugs as examples of work items. These examples should be understood, however, as not limiting application of the invention to only software-related activities.

The work items can be linked to other types of items that also are related to the subject of the work item. For example, if the work item is a bug, the work item can be linked to the software code containing the bug.

For example, when a work item associated with a bug is modified, the work item can be linked to a source-controlled file relating to the bug. For example, if a bug-related work item assignee corrects a software flaw in software code, the work item could be linked to the affected source file. In this manner, the bug-related work item can be linked to the corrected software code, which can be available to other workers.

During a software development project, software bugs generally must be detected and then tracked through resolution and testing. Thus, the method 200 can permit members of a project team to create bug-related work items as bugs are detected. An initial detector of a bug can create and assign a work item for the bug. For example, the work item can be assigned to a group that in turn must assign initial responsibility for investigation of the bug.

In one embodiment, each of the stored work-item versions are complete copies of the associated work item. The stored versions can be copy-protected to preserve an accurate historical record of work-item progression.

The database can be any type of suitable database. For example, the database can be a relational database. As known to one having ordinary skill in the database arts, a relational database stores data inside tables. Operations on data stored in the database can be performed on the tables themselves or produce tables as a result. For example, in one embodiment, each row of a table stores a version of a work item, and the columns of the table correspond to field types of the work item.

Figures 3, 4:
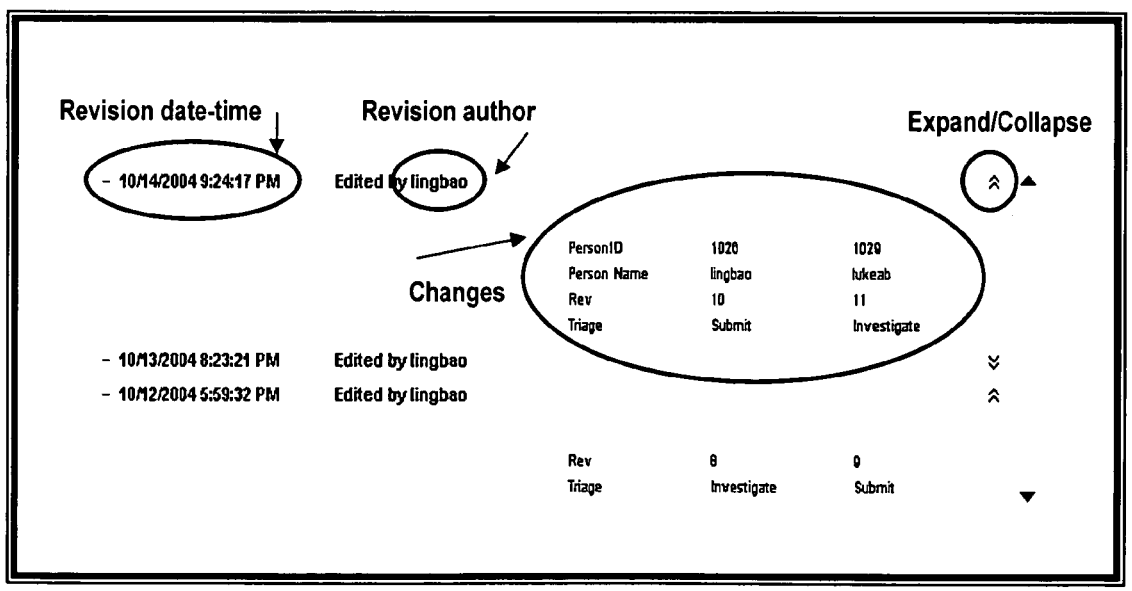
FIG. 3 is a table of data that can be displayed in response to a database query, in accordance with one embodiment of the present invention.
FIG. 4 is a screen shot of data that can be displayed in response to a database query, in accordance with one embodiment of the present invention.

Next referring to FIG. 3, an example of a work item that can be stored in a relational database, or other suitable database, is described. FIG. 3 is a table of field types and associated values for an example of a work item, in accordance with one embodiment of the invention. The table includes values for a current version (indicated by "new value" entries), which have replaced a prior version (indicated by "old value" entries.)

The work item includes the following fields: an Assignee field that identifies an individual having an assigned responsibility associated with the work item; a Person ID field for an identifying number associated with the assigned individual; a Revision field for a version number that increments as each new version is created; an Author field that identifies an individual that initiated the changes memorialized in the associated version; a Triage field that indicates an activity assigned to the assignee; and a Created field that indicates the date of creation of the associated version. Each version of the work item may be viewed as current during the period of time that begins with its date of creation and ends with the creation date of the next version.

The table only lists those work-item fields that incurred a value change upon storage of the new version. Hence, the work item can include additional fields. For example, a work item can include a field that identifies a status of the work item, such as active, inactive, or completed.

One or more of the fields can be associated with one or more indices, such as the above-described Revision field. Some or all indices can help to identify a version of a work item. The Created field, described above, can also be viewed as a version identifier.

To exploit the historical database of work items provided by use of the method 200, a database search capability can be provided. The method 200 can then include receiving a query 240. If the database is a relational database, any suitable query language can be use, such as the Structured Query Language (SQL) or a variant of SQL. Through use of SQL, for example, the database can be queried, updated, and managed.

The method 200 can also include displaying 250, in response to a query, information associated with at least one of the one or more prior versions. Query-related and display-related features of some embodiments of the invention are described next.

Queries can be formulated to provide a variety of information related to the historical work item-related data available from the database. For example, a search can be targeted at any one or combination of the following: a specific version; versions created at a particular time or during a particular period of time; versions assigned to a particular individual, for example, at a particular time or durinig a particular time; versions that transitioned in state at a particular time or during a particular time; and/or versions having a particular value for a particular field.

The method 200 an include use of a SQL-like language having query operations that facilitate searches of the work item-related database. For example, the query language can include an "AS OF" operation to search versions created on or after a specified date. As another example, the query language can include an "EVER" operation to search all versions for a specified content.

For example, the database can be queried by an assignee to obtain a list of work items assigned to the assignee. The assignee can, for example, formulate a query that includes or excludes any field type, date or date range, and/or field values. A team leader can, for example, search for bugs assigned to the team, and then update the located work items to assign the bugs to developers for correction.

The following queries illustrate the appearance of a query as-formulated by a team member, for one embodiment of the invention that uses a modified-SQL query language.

The query,
SELECT * From Issue Where State Ever 'Blocked' searches all fields of all work items that were ever in a "Blocked" state.

The query,
SELECT Title From Issue Where [Assigned To]='Jack' And Priority Not Ever 3 searches for the Title of all work items that are assigned to Jack, but never had a Priority of 3.

The query,

SELECT ID From Issue Where (Priority>2) AsOf'10/2/ 2004 11:00'searches for the IDs of all work items that had a priority greater than 2 as of 10/2/2004 11:00 AM.

The query,

SELECT Title From Issue Where [Assigned To]=Jack AsOf'1/1/2004 20:00'searches for the Title of all work items that were assigned to Jack as of 1/1/2004 10:00 PM.

The results of a search of the work-item database can be presented in any suitable format. For example, the results of a search can be presented in a control. The control can present, for example, the full contents of work items or the contents of changed fields. FIG. 4 is an illustrative screen shot of a display of query results for one embodiment of the invention. In response to a query, the illustrative display includes work-item data related to three versions of a work item as indicated by various version identifiers.

For example, each version is identified by its associated "birth" date and time (listed in the left-most column.) Each version is also identified by a revision number, which, in this example, is sequentially incremented as each new version is created.

In this example, each new version was created in response to changes made by Revision author "lingbao" to a prior version of the work item. The example display presents a row entry for each work item version returned in response to a search. Toggles, on the right side of the display, to expand/collapse the contents of each listed work item permit a viewer of the display to expand the contents of any listed version for review.

In the screen shot of FIG. 4, revisions "9" and "11" are expanded and revision "10" is collapsed. In this example, only field values that were changed are displayed. For example, revision "9" was created when "lingbao" changed the presently required action from "investigate" to "submit." Revision "11" was created when "lingbao" changed the presently required action from "submit" to "investigate" and changed the assignee from "lingbao" to "lukeab."

Figure 5:
FIG. 5 is a screen shot of a querying user interface, in accordance with one embodiment of the present invention.
Figure 5:

FIG. 5 is an illustrative screen shot of a querying user interface, in accordance with one embodiment of the invention. In response to a query, the illustrative screen shot includes work-item data related to three versions of a work item, as indicated by various version identifiers.

An upper portion 510 of the screen shot displays query parameters selected for a search. A lower portion 520 of the screen shot displays a list of versions that have been returned in response to the query parameters shown in the upper portion 510.

The example query was formulated to extract work items having all of the following values: a "Portfolio Project" field-type value equal to "@Project"; an "Assigned To" field-type value that ever had a value of "dougn"; and a "State" field-type value equal to "Active". In the lower portion 520, each listed version includes a version identifier (ID) and a work-item version title. For example, one of the version returned in response to the query has an ID value of 10744 and a title of Create Project Plan. In one embodiment, the contents of any one of the listed versions is displayed in response to a selection made by a user.

As described above, it should be appreciated that at least some features of the method 200 outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs, when executed, need not reside on a single computer or processor, but may be distributed in a modular fashion amongst a number of different computers or processors to implement various aspects of the present invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for work-item tracking in a computer system comprising a plurality of client computers and at least one server maintaining a database for the plurality of client computers, the method comprising:

with a processor, receiving user input defining a plurality of work items each comprising a plurality of fields that are each associated with a corresponding field value, a first of the plurality of fields comprising a field value identifying a task, and a second of the plurality of fields comprising a field value identifying a group or person assigned to perform the task, wherein a first portion of the plurality of work items comprises current versions of work items and second portion of the plurality of work items comprises prior versions of the current versions of the work items, and wherein each of the work items in at least a subset of the plurality of work items relates to a task associated with development of software code;

for each of the plurality of work items, associating each of a plurality of version identifiers with a corresponding one of the current version and one or more prior versions of the work item;

storing, in the database in a computer storage medium, for each work item of the plurality of work items, work-item data comprising the current version, the one or more prior versions, and the plurality of version identifiers, and for each work item in the subset, storing in the database a link to the associated software code;

receiving a user input search query comprising a first portion and a second portion, the first portion of the query specifying an assignee assigned to or status of a work item and the second portion of the query specifying a time criteria;

searching the database in response to the query to identify current and prior versions of work items meeting the assignee or status specified in the first portion of the query at a time meeting the time criteria in the second portion of the query; and providing an electronic display displaying information comprising at least a portion of the work-item data associated with each of one or more prior versions assigned to the assignee as of the time specified in the second portion of the query and at least one electronic link to software code associated with the identified work items.

2. The method of claim 1, wherein each of the stored one or more prior versions of the at least one work item is a complete copy of the prior version.

3. The method of claim 1, wherein storing comprises storing the one or more prior versions in a form that is unchangeable by users of the computer system.

4. The method of claim 1, wherein one of the fields is associated with an index, and further comprising creating values of the index in an order of creation of the stored versions.

5. The method of claim 1, wherein each of the plurality of version identifiers includes information indicating an identity of a version author.

6. The method of claim 1, wherein each of the plurality of version identifiers includes information indicating a time of creation of the corresponding version.

7. The method of claim 1, wherein storing comprises storing, for at least one of the one or more prior versions, only field values that changed relative to an immediately prior version.

8. The method of claim 1, further comprising, in response to a selection of one of the stored versions, displaying information comprising at least a portion of the work-item data associated with the selected version.

9. The method of claim 1, wherein the query identifies current and prior versions of work items having a status specified in the first portion of the query as of a time specified in the second portion of the query.

10. The method of claim 9, wherein the query is formatted in a Structured Query Language including an "AS OF" operator.

11. The method of claim 1, wherein the displayed information comprises a current value and a different prior value of one of the one or more fields.

12. The method of claim 1, wherein the displayed information comprises information identifying an author of a displayed work item and a version identifier of the plurality of version identifiers associated with the displayed work item.

13. The method of claim 1, wherein the query is constructed to provide a search associated with a single value or a range of values or all values of the plurality of version identifiers.

14. The method of claim 13, wherein each of the plurality of version identifiers includes information indicating a time of creation of the corresponding version, and the second portion of the query is constructed to provide a search associated with a specific time of creation or a range of times of creation.

15. The method of claim 1, wherein the query directs a search of any one or more of all of the plurality of versions of the at least one work item.

16. A computer storage medium encoded with a program for execution on at least one processor of at least one server, the program, when executed on the at least one processor, performing a method for work-item tracking in a computer system comprising a plurality of client computers and the at least one server maintaining a database for the plurality of client computers, the method comprising:
    defining a plurality of work items each comprising a plurality of fields that are each associated with a corresponding field value, a first of the plurality of fields comprising a field value identifying a task, and a second of the plurality of fields comprising a field value identifying a group or person assigned to perform the task, wherein a first portion of the plurality of work items comprises current versions of work items and second portion of the plurality of work items comprises prior versions of the current versions of the work items, and wherein at least a subset of the plurality of work items relates to a task associated with development of software code;
    for each of the plurality of work items, associating each of a plurality of version identifiers with a corresponding one of the current version and one or more prior versions of the work item;
    storing, in the database in a computer storage medium, for each work item of the plurality of work items, work-item data comprising the current version, the one or more prior versions, and the plurality of version identifiers, and for each work item in the subset, storing in the database a link to the associated software code;
    receiving a query comprising a first portion and a second portion, the first portion of the query specifying at least one assignee and the second portion of the query specifying a time criteria;
    searching the database in response to the query to identify work items of the plurality of work items assigned to the at least one assignee specified in the first portion of the query at a time meeting the time criteria in the second portion of the query; and
    providing a display based on the identified work items, the display comprising at least a portion of the work-item data associated with each of one or more prior versions assigned to the assignee as of the time specified in the second portion of the query, and for each work item in the subset among the identified work items, the display links the associated software code to the identified work item.

17. The computer storage medium of claim 16, wherein the query is formatted in a Structured Query Language including an "AS OF" operator.

18. The computer storage medium of claim 16, wherein:
    the first portion of the query specifies a software development group that is an assignee for a work item; and
    providing a display comprises displaying information comprising at least a portion of the work-item data associated with each of one or more prior versions assigned to the software development group as of the time specified in the second portion of the query.

19. A method for work-item tracking in a computer system comprising a plurality of client computers and at least one server maintaining a database for the plurality of client computers, the method comprising:
    with a processor, receiving user input defining a plurality of work items each comprising a plurality of fields that are each associated with a corresponding field value, a first of the plurality of fields comprising a field value identifying a task, and a second of the plurality of fields comprising a field value identifying a group or person assigned to perform the task, wherein a first portion of the plurality of work items comprises current versions of work items and second portion of the plurality of work items comprises prior versions of the current versions of the work items, and wherein at least a subset of the plurality of work items relates to a task associated with development of software code;
    for each of the plurality of work items, associating a time value indicating the time of creation of the work item;
    storing, in the database in a computer storage medium, for each work item of the plurality of work items, work-item data comprising the current version, the one or more prior versions, and the plurality of version identifiers, and for each work item in the subset, storing in the database a link to the associated software code;

receiving a user input search query comprising a first portion and a second portion, the first portion of the query specifying an assignee assigned to a work item and the second portion of the query specifying a time criteria;

searching the database in response to the query to identify work items of the plurality of work items meeting the at least one characteristic specified in the first portion of the query at a time meeting the time criteria in the second portion of the query, the identified work items all meeting the time criteria based on a comparison of the time criteria to the time of creation associated with the work item; and providing an electronic display based on the identified work items, the display comprising scheduling the identified work items using a scheduling tool, and an electronic link to software code associated with the identified work items.

* * * * *